US008913278B2

(12) United States Patent
Tsunekawa

(10) Patent No.: US 8,913,278 B2
(45) Date of Patent: Dec. 16, 2014

(54) IMAGE FORMING APPARATUS, CONTROL METHOD THEREOF, AND STORAGE MEDIUM

(71) Applicant: Canon Kabushiki Kaisha, Tokyo (JP)

(72) Inventor: Kiyohiro Tsunekawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 51 days.

(21) Appl. No.: 13/689,373

(22) Filed: Nov. 29, 2012

(65) Prior Publication Data

US 2013/0201521 A1    Aug. 8, 2013

(30) Foreign Application Priority Data

Feb. 7, 2012    (JP) ................................. 2012-024523

(51) Int. Cl.
*G06F 3/12*    (2006.01)
*G06K 15/00*    (2006.01)
*H04N 1/00*    (2006.01)
*G09G 5/00*    (2006.01)

(52) U.S. Cl.
CPC .... *H04N 1/00442* (2013.01); *H04N 2201/0094* (2013.01); *G09G 5/00* (2013.01); *H04N 1/00453* (2013.01); *H04N 1/00233* (2013.01)
USPC .......... 358/1.15; 358/1.16; 358/1.18; 358/1.6

(58) Field of Classification Search
USPC .............. 358/1.15, 1.16, 1.18, 1.6, 3.24, 501, 358/527, 538, 540; 709/206, 207, 218, 224, 709/217, 201, 202, 203, 219, 227, 238, 709/404; 715/274, 200, 243, 245, 276, 277, 715/700, 738, 746, 762, 769, 770, 788, 798, 715/805
See application file for complete search history.

(56) References Cited

U.S. PATENT DOCUMENTS

| 7,505,156 B2 | 3/2009 | Tsunekawa |
| 2006/0158706 A1* | 7/2006 | Mori et al. .................... 358/540 |
| 2008/0316526 A1* | 12/2008 | Matsuzaki et al. ........... 358/1.15 |
| 2009/0122337 A1* | 5/2009 | Park et al. .................... 358/1.15 |
| 2009/0147310 A1 | 6/2009 | Tsunekawa |
| 2010/0027056 A1 | 2/2010 | Ogino et al. |
| 2010/0231937 A1 | 9/2010 | Tsunekawa |

FOREIGN PATENT DOCUMENTS

| JP | 2003-87560 A | 3/2003 |
| JP | 2010-35030 A | 2/2010 |

* cited by examiner

*Primary Examiner* — Ngon Nguyen
(74) *Attorney, Agent, or Firm* — Fitzpatrick, Cella, Harper & Scinto

(57) ABSTRACT

An image forming apparatus which displays a preview of a relevance according to output forms between a plurality of pages upon outputting images of the plurality of pages, a control method thereof, and a program are provided. To accomplish this, this image forming apparatus analyzes a predetermined relevance according to output forms between pages based on setting information of print data, generates a preview image including a plurality of pages having the predetermined relevance as a group for a page for which the predetermined relevance is specified, generates a preview image of only a page for which the predetermined relevance is not specified, and displays the preview image including the plurality of pages as the group on a display unit.

12 Claims, 10 Drawing Sheets

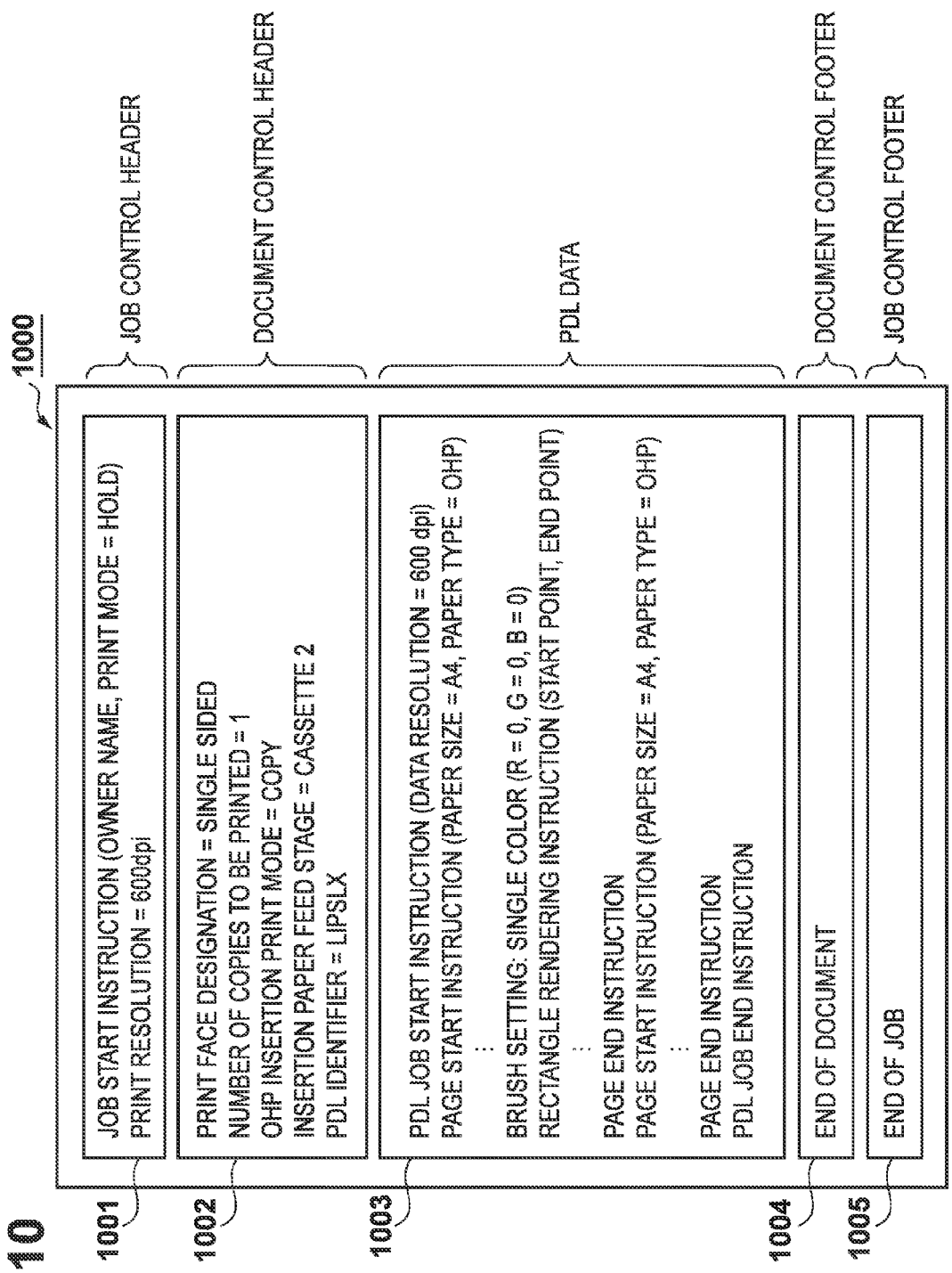

IMAGE FORMING APPARATUS, CONTROL METHOD THEREOF, AND STORAGE MEDIUM

BACKGROUND OF THE INVENTION

1. Field of the Invention

The present invention relates to an image forming apparatus which displays a preview upon outputting images of a plurality of pages, a control method thereof, and a storage medium.

2. Description of the Related Art

Some image forming apparatuses such as digital multifunction peripherals (MFPs) include a function of displaying a thumbnail of a generated page image as an image formation target on a liquid crystal panel of an operation unit as a preview so as to prevent a wasteful output due to a setting error. In an image forming apparatus which includes post-processing functions such as stapling, folding, and punch hole functions, a method of processing a page image generated based on input print data, and displaying a finish preview which allows the user to recognize a final output form applied with post-processes has been proposed.

For example, Japanese Patent Laid-Open No. 2003-87560 has proposed an image forming apparatus which displays pages in a two-page spread state except for the first and last pages, when post-processing is stapling processing upon displaying a finish image indicating a state applied with the post-processing by processing image data obtained by converting input image data to reduced-scale data. Also, Japanese Patent Laid-Open No. 2010-35030 has proposed a preview method which prevents user's confusion by displaying finish information outside a print sheet area of a preview image so as to improve visibility, and deciding a direction of the preview image in accordance with the convey direction of a sheet.

However, the above related arts suffer the following problems. For example, in an image forming apparatus which includes a preview function in consideration of post-processing like in the related art, the user can confirm if post-processing settings are as the user intended, but a configuration which allows the user to recognize a relationship between pages before and after a preview target page is not provided. That is, in a preview of the related art, a preview image is displayed by reflecting a finish result for each page image of a sheet, or only the method of displaying sheets in a two-page spread state upon designation of stapling as a case in which pages are displayed to allow easy understanding of an antero-posterior relationship has been proposed. For this reason, in an image forming apparatus including various finishing functions and output instruction forms, a preview method which allows the user to easily recognize a relevance according to output forms between a plurality of pages such as the antero-posterior relationship or positional relationship of a plurality of pages to be output is demanded.

SUMMARY OF THE INVENTION

The present invention enables realization of an image forming apparatus which displays a preview of a relevance according to output forms between a plurality of pages upon outputting images of the plurality of pages, a control method thereof, and a storage medium.

One aspect of the present invention provides an image forming apparatus for executing image formation according to print data having a plurality of pages, comprising: an analysis unit configured to analyze a predetermined relevance according to output forms between pages based on setting information of the print data; a generation unit configured to generate a preview image including, as a group, a plurality of pages having the predetermined relevance for a page for which the predetermined relevance is specified by the analysis unit, and to generate a preview image of only a page for which the predetermined relevance is not specified by the analysis unit; and a display control unit configured to display the preview image including the plurality of pages as the group generated by the generation unit on a display unit.

Another aspect of the present invention provides a control method of an image forming apparatus for executing image formation according to print data having a plurality of pages, comprising: controlling an analysis unit to analyze a predetermined relevance according to output forms between pages based on setting information of the print data; controlling a generation unit to generate a preview image including, as a group, a plurality of pages having the predetermined relevance for a page for which the predetermined relevance is specified in the controlling the analysis unit, and to generate a preview image of only a page for which the predetermined relevance is not specified in the controlling the analysis unit; and controlling a display control unit to display the preview image including the plurality of pages as the group generated in the controlling the generation unit on a display unit.

Still another aspect of the present invention provides a computer-readable medium storing a computer program for controlling a computer to execute respective steps in the control method of an image forming apparatus.

Yet still another aspect of the present invention provides an image forming apparatus for executing image formation according to print data having a plurality of pages, comprising: a display unit configured to display a preview image; an analysis unit configured to analyze a relevance between pages based on setting information of print data; a generation unit configured to generate a preview image so that a plurality of pages having the relevance analyzed by the analysis unit are displayed on a single screen of the display unit; and a display control unit configured to display the preview image including the plurality of pages generated by the generation unit as a group on the display unit.

Further features of the present invention will be apparent from the following description of exemplary embodiments with reference to the attached drawings.

BRIEF DESCRIPTION OF THE DRAWINGS

FIG. 10 is a view showing the configuration of print data according to the third embodiment.

DESCRIPTION OF THE EMBODIMENTS

Figure 1:
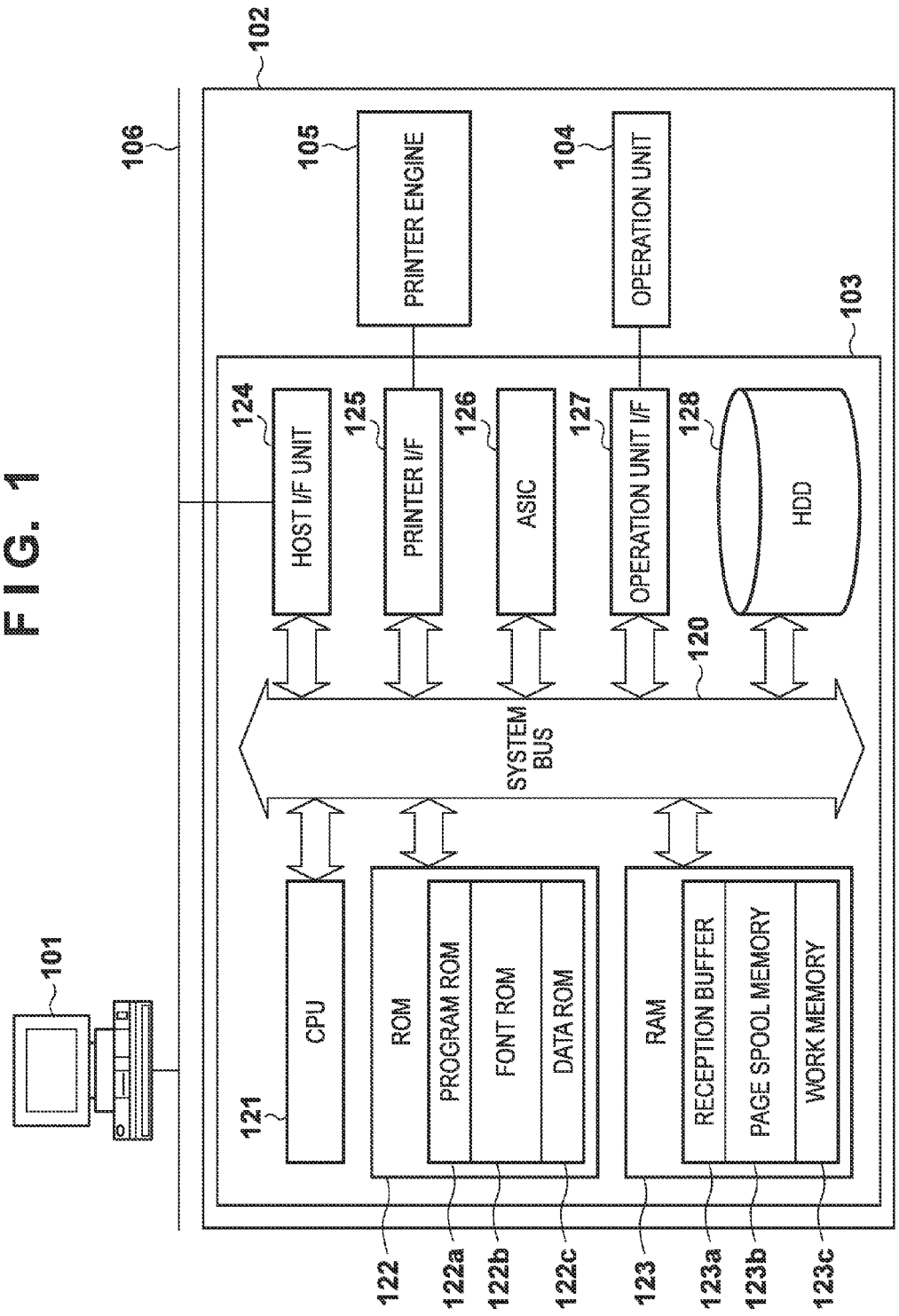
FIG. 1 is a block diagram showing an example of the arrangement of an image processing system including an image forming apparatus according to the first embodiment.

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Arrangement of Image Forming Apparatus

The first embodiment for practicing the present invention will be described hereinafter with reference to FIGS. 1 to 4. An example of the arrangement of an MFP (multifunction peripheral) 102 as an image forming apparatus of this embodiment, and an image forming system including the MFP 102 will be described first with reference to FIG. 1. In the image forming system, a personal computer (to be abbreviated as a PC hereinafter) 101 which generates and outputs print data, and the MFP 102 are connected via a LAN 106. The MFP 102 can print image data received from the PC 101 as an information processing apparatus, and can transmit image data which has undergone image processing to the PC 101 via the LAN 106.

The MFP 102 includes a controller board 103, operation unit 104, and printer engine 105. The controller board 103 includes a CPU 121, ROM 122, RAM 123, host I/F unit 124, printer I/F 125, ASIC 126, operation unit I/F 127, and HDD 128. Respective devices included in the controller board 103 can exchange data with each other via a system bus 120. The ROM 122 includes a program ROM 122a, font ROM 122b, and data ROM 122c. The RAM 123 includes a reception buffer 123a, page spool memory 123b, and work memory 123c.

The CPU 121 systematically controls the respective devices connected to the system bus 120 in the controller board 103 as a control unit of the MPU 102, thereby outputting a printed matter. The CPU 121 analyzes, for example, print data input from the PC 101, that is, PDL data to generate a page image by executing a control program stored in the program ROM 122a in the ROM 122. Then, the CPU 121 outputs a video signal corresponding to the page image to the printer engine 105 connected via the printer I/F 125 similarly by the aforementioned control program, thereby forming a developing agent (toner) image corresponding to the page image on a printing material (paper sheet) by a given electrophotography technique. Also, the CPU 121 has a function of generating a preview image (to be described later) based on the PDL data, and displaying it on a liquid crystal panel (display unit) included in the operation unit 104.

The ROM 122 also includes the font ROM 122b and data ROM 122c including various image processing tables and the like. The RAM 123 also functions as a work memory used to hold various data for analysis processing in addition to a program area used to load the control program. The RAM 123 includes the reception buffer 123a used to temporarily hold received print data, the page spool memory 123b used to hold rendering objects obtained from the analysis result of the print data, and the work memory 123c used to store temporary data and a preview image.

The hard disk driver (to be abbreviated as an HDD hereinafter) 128 is a nonvolatile storage device which saves various registration data using a file system, and compresses and spools a page image generated based on rendering objects. The HDD 128 is also used as an area for storing print data of a box print function (to be described later). Furthermore, the HDD 128 may store the control program in place of the program ROM 122a.

The operation unit 104 includes an operation panel used to make various operations such as setting and resetting of menu items, and an LCD used to display various statuses of the devices and a preview image. Note that to the printer engine 105 applied to this embodiment, various other printing systems such as an ink-jet printer are applicable in addition to the MFP adopting the electrophotography technique. Furthermore, an arrangement of a single-function peripheral (SFP) may be adopted. Note that in this embodiment, the single controller board 103 controls the MFP 102 for the sake of simplicity. Alternatively, independent controller boards may be equipped for respective function units, and CPUs of the respective boards may execute overall control by communicating with each other. For example, in case of the MFP 102, controller boards may be equipped for respective function units such as the printer engine 105, various finishers, a scanner unit, and a facsimile apparatus (not shown).

<Software Configuration>

Figure 2:
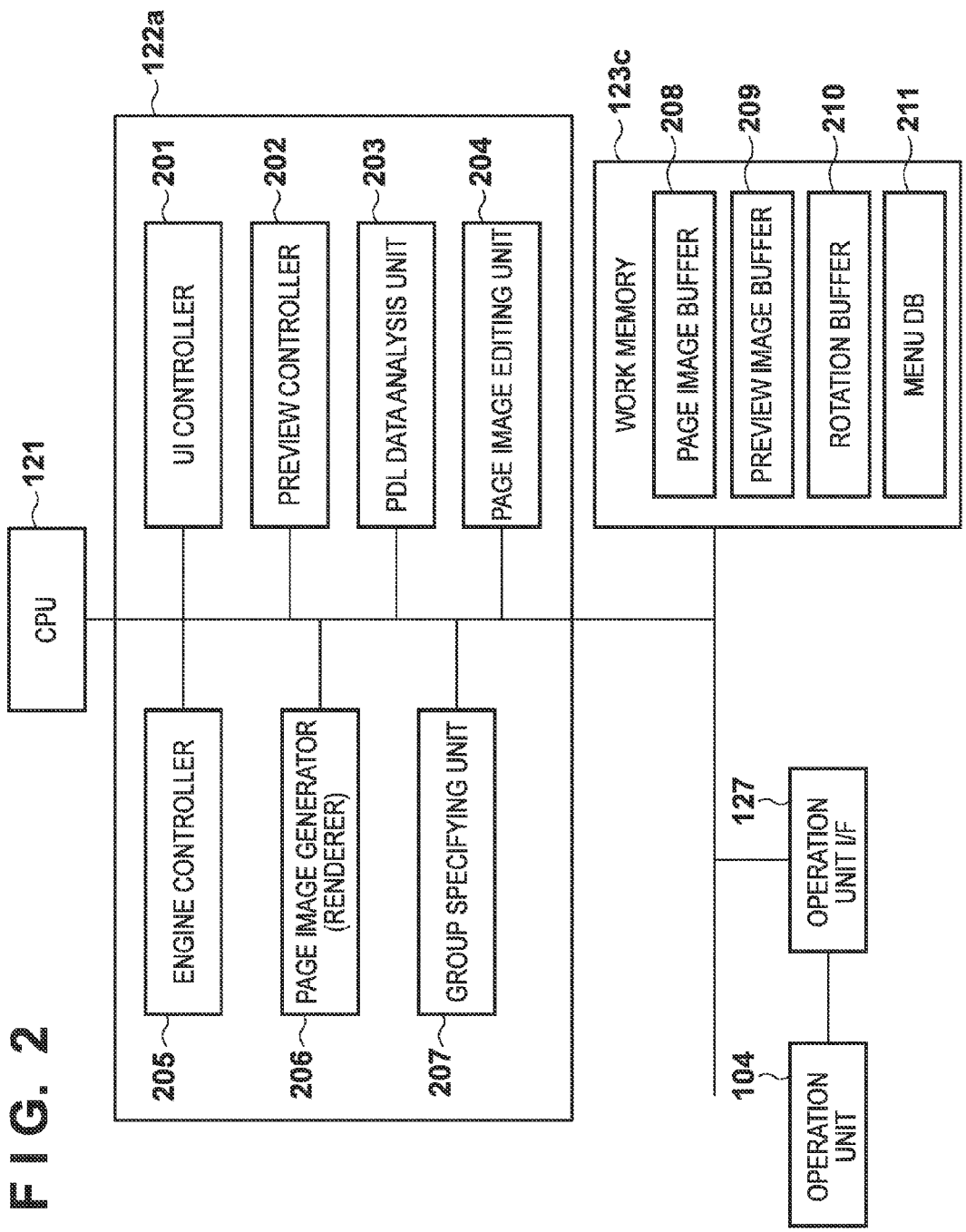
FIG. 2 is a diagram showing an example of the configuration of software modules and a work memory according to the first embodiment.

The preview sequence will be described below with reference to FIG. 2 together with software modules stored in the program ROM 122a of the controller board 103 and the configuration of the work memory 123c managed by the software modules. Note that the same reference numerals denote the components described using FIG. 1, and a description thereof will not be repeated. In this case, respective sequences required to implement the present invention (to be described later) are implemented when the CPU 121 loads and executes program codes of the software modules. The software modules to be described below may be implemented as hardware modules or combinations of hardware and software modules.

The controller board 103 includes, as software modules, a UI controller 201, preview controller 202, PDL data analysis unit 203, page image editing unit 204, engine controller 205, page image generator 206, and group specifying unit 207. The UI controller 201 systematically controls inputs/outputs from the operation unit 104 via the operation unit I/F 127. That is, the UI controller 201 receives input values upon generation of various operation images such as menus to be displayed on the LCD and those of various menu settings by user's panel operations, and holds these input values in a menu DB 211 in the work memory 123c. Then, the PDL data analysis unit 203 (to be described later) or the like refers to the menu DB 211 to reflect the menu settings to rendering results and various print operations.

The preview controller 202 is a control module which is called from the UI controller 201, and executes general preview display control of input print data (image data). In this embodiment, assume that in a function of holding received print data in a predetermined folder in the HDD 128, and then outputting print data selected by the UI controller 201 according to a user operation (output form), a preview display mode can be designated. Note that as function examples which assume the print sequence, a hold print function which temporarily holds print data in a folder and deletes that data after sheets are discharged, a secret print function which requests a password at the time of an output instruction, a box print function which holds print data even after sheets are discharged, and the like are available, but the present invention is not limited to them.

In this case, settings of the hold print function and the like are appended to print data by making the settings from a setting screen of a printer driver which runs on the PC 101, and these functions are implemented when the PDL data analysis unit 203 interprets the settings. Alternatively, these functions may be set by a direct print function which designates print data of a predetermined format from a remote UI screen displayed on a browser by a remote UI operation unit (not shown). In this embodiment, various image data such as JPG data and TIFF data in addition to PDF and XPS data have formats that can be designated, and can be directly analyzed by the PDL data analysis unit 203 without requiring any printer driver.

The PDL data analysis unit 203 interprets input print data, generates rendering objects in an intermediate format corresponding to PDL commands in the print data, and stores these objects in the page spool memory 123b. In this case, the PDL data analysis unit 203 reads out print data from the reception buffer 123a in a normal print mode, while it is called from the preview controller 202 in a preview display mode and reads out print data held in a folder in the HDD 128. Note that rendering objects are generated at a resolution (for example, 600 dpi) suited to the printer engine 105 in the normal print mode, and at a resolution (for example, 72 dpi) suited to the LCD in the preview display mode.

The page image generator 206 is a renderer which generates a corresponding page image with reference to rendering objects, and stores the page image in the HDD 128 in the normal print mode or in a page image buffer 208 of the work memory 123c in the preview display mode. The engine controller 205 compresses the page image generated by the renderer, stores the compressed page image in the HDD 128, and outputs an image signal based on the compressed page image to the printer engine 105 via the printer I/F 125 in the normal print mode. Furthermore, assume that the engine controller 205 executes general control of print operations such as processing for deciding a convey direction of a sheet by acquiring paper size information of a paper cassette, and processing for outputting a paper feed request to the operation unit in case of an out-of-paper state.

The page image editing unit 204 is a module called from the preview controller 202 in the preview display mode, generates a preview image by processing a page image in the page image buffer 208, and stores the preview image in a preview image buffer 209. In this case, the page image editing unit 204 generates one preview image including at least one or more page images based on the determination result of the group specifying unit 207 (to be described later) and print setting information in PDL data.

The group specifying unit 207 is called from the preview controller 202 in the preview display mode, and determines a relevance according to output forms between a plurality of continuous pages based on print setting information or page information in PDL data obtained by sending an inquiry to the PDL data analysis unit 203. Then, the group specifying unit 207 handles a plurality of pages determined to have the relevance as one group using a preview target page as a base point, and notifies the preview controller 202 of the number of pages which belong to that group. Note that the determination condition of the relevance between pages will be described later. The preview controller 202 notifies the page image editing unit 204 of a page number of the preview target used as a base point, the number of pages which belong to the group, and print setting information, and generates a preview image which combines the plurality of pages in the identical group into one.

<Preview Display>

A state in which a preview of a plurality of pages having the relevance is displayed on a single screen as one group under the control of the preview controller 202 will be described below with reference to FIG. 3. In this case, the determination condition of the relevance between the plurality of pages in this embodiment is information as to whether or not a poster print mode is set, and the number of pages of a group is calculated based on the number of layout pages in the poster print mode. That is, for example, when the number of layout pages is 2×2, the number of pages of a group is 4, and when it is 1×2, the number of pages in a group is 2.

Figure 3:
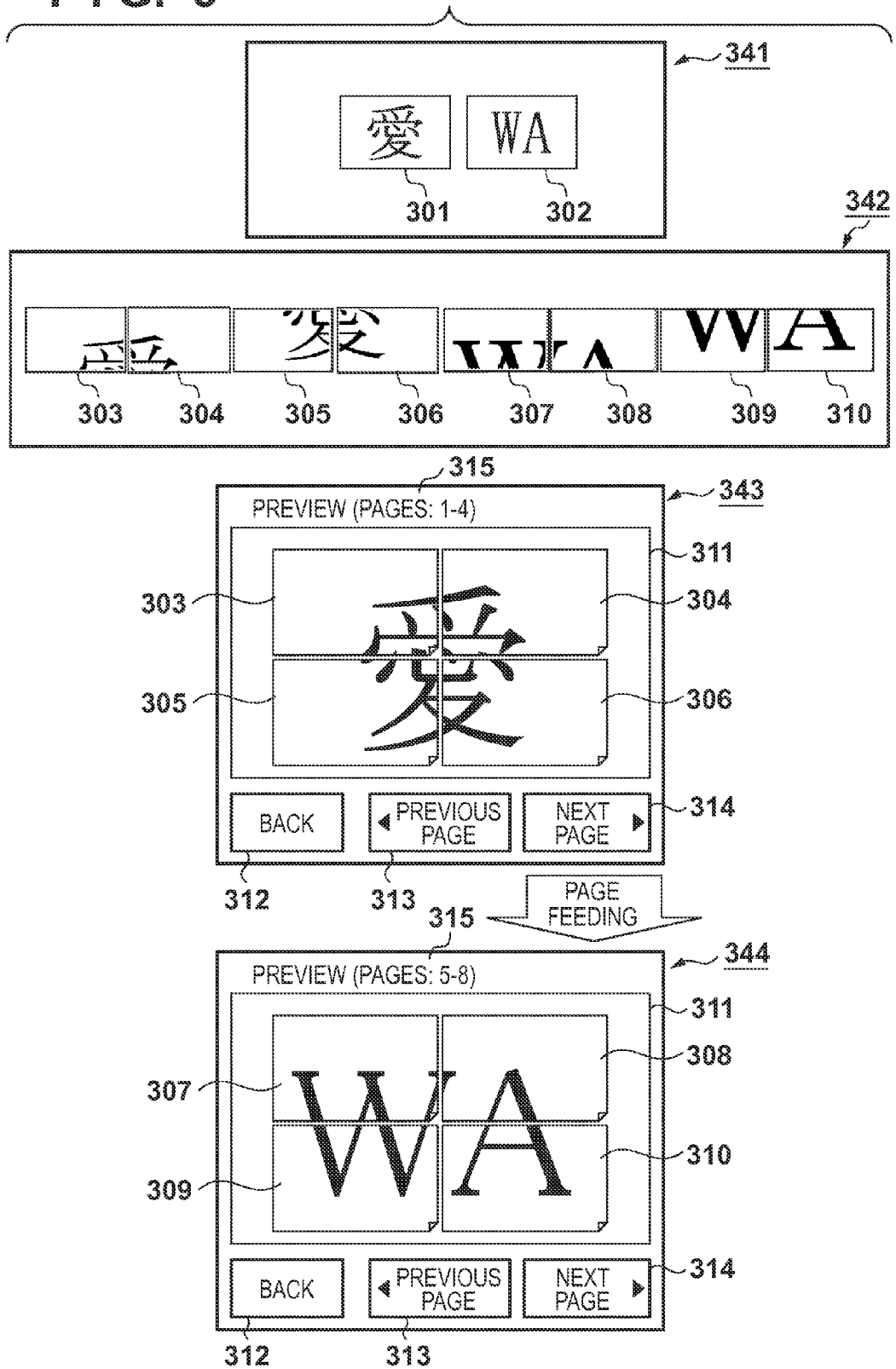
FIG. 3 is a view showing the data configuration and a preview screen example according to the first embodiment.

In FIG. 3, reference numeral 341 denotes page contents of a print document; and 301 and 302, examples of page 1 and page 2 to be handled by application software such as a word-processor which runs on the PC 101. Reference numeral 342 denotes a state of PDL data generated by the printer driver which receives an instruction from the application when the poster print mode is set on the setting screen of the printer driver for the print document of the page contents 341.

In this case, the state 342 indicates a case in which "2×2" is designated as the number of layout pages of the poster print mode, PDL data for four pages 303 to 306 are generated from the document page 301, and those for four pages 307 to 310 are generated from the document page 302. When the poster print mode is designated as a print setting, the printer driver generates PDL data by determining an enlargement factor and coordinate axes of rendering commands according to the number of layout pages, and assigns respective pages according to the number of layout pages to the PDL data. In case of this embodiment in which the number of layout pages is 2×2, since the enlargement factor is 200% and the coordinate axes of the rendering commands are set to have an upper left corner of the page 303 as an origin, desired rendering results of the poster print mode can be obtained. Note that the driver does not generate any PDL data of a rendering command which extrudes from a sheet, or the PDL data analysis unit 203 of the MFP 102 may clip out that region. In this manner, when the poster print mode (the number of layout pages=2×2) is designated for documents of two pages, print data including PDL data for eight pages and print setting information including the number of layout pages of the poster print mode is generated.

Reference numerals 343 and 344 denote states of the LCD screen of the operation unit 104 upon execution of a preview display operation of the print data 342. In the state 343, reference numeral 311 denotes a display area of a preview image, and since group specifying unit 207 determines that the number of pages of a group is 4, the preview image is displayed on the display area to have four pages 303 to 306 as one group. Note that when a page number in the preview display mode is displayed on a screen area 315, a base point page number and page numbers by adding the number of pages—1 of the group to the base point page number are displayed.

Reference numeral 312 denotes a software key which is used to return to the previous screen, and is configured to return to, for example, a screen which allows the user to select print data to be printed in the box print function from a candidate list in response to a key touch. By touching software keys 313 and 314, the preview image can be fed to previous and subsequent pages (next pages). However, since the state 343 displays a preview image for the first page of the document, the "previous page" key 313 is displayed to be grayed out and cannot be selected. In this case, when the user touches the "next page" key 314, the preview controller 202 advances the base point of a page to be displayed next by 4 as the number of pages of a group from the currently displayed page, the page images 307 to 310 of the 5th page and subsequent pages are displayed on a single preview screen, as indicated by the state 344. In this manner, the preview controller 202 functions as a display control unit, and displays preview images on the operation unit 104 (display unit) in a page order.

<Preview Display Processing>

Figure 4:
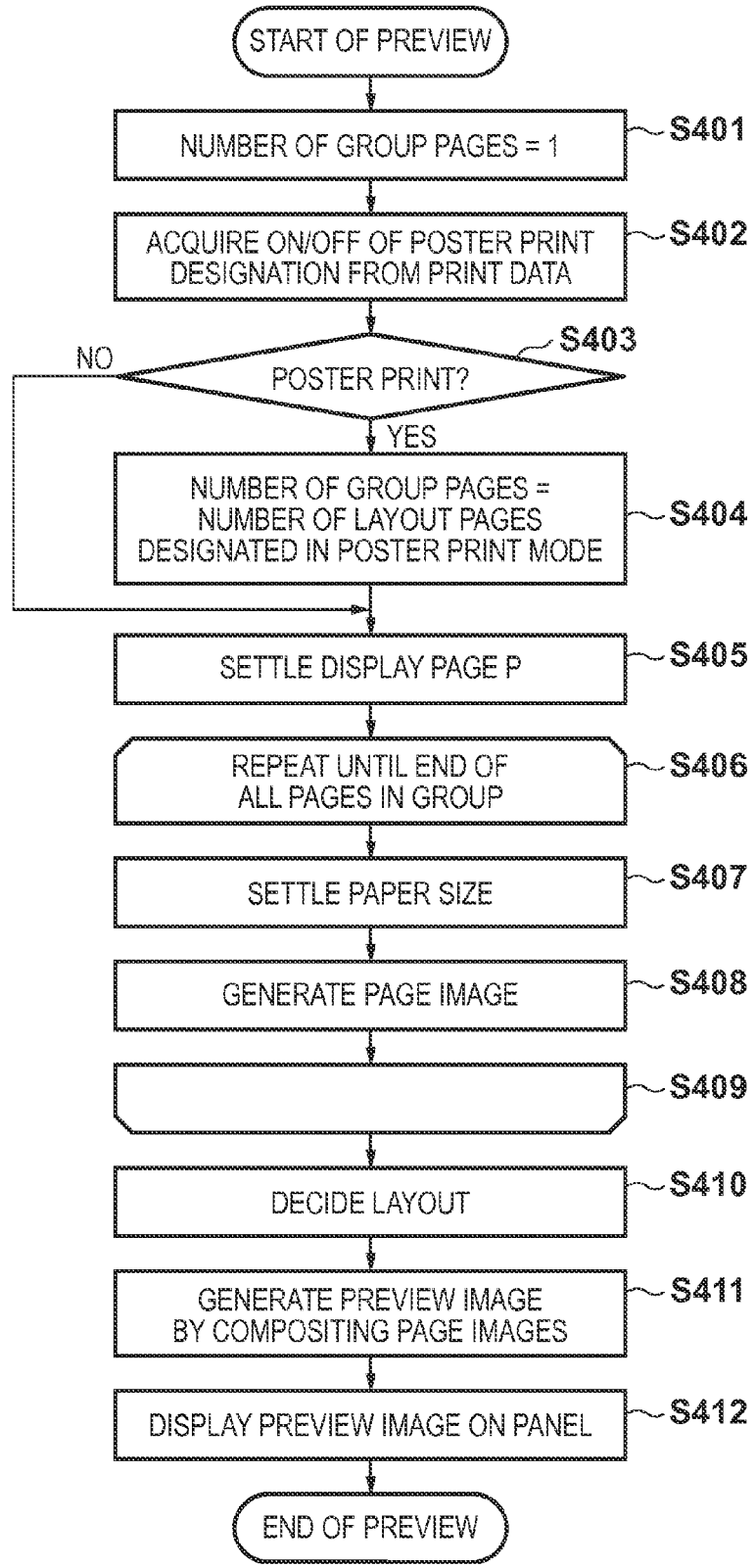
FIG. 4 is a flowchart showing the sequence of preview processing according to the first embodiment.

The preview processing sequence executed when the user designates the poster print mode as a print setting, and selects preview target print data from those displayed in a list on the operation unit 104 will be described below with reference to FIG. 4. Note that respective steps in FIG. 4 are implemented when the CPU 121 loads and executes program codes of the respective modules shown in FIG. 2 in the program ROM 122a.

In step S401, the preview controller 202 initializes the number of pages of groups (to be referred to as the number of group pages hereinafter) to "1", and then calls the group specifying unit 207. In step S402, the group specifying unit 207 sends an inquiry to the PDL data analysis unit 203 to acquire the number of layout pages of the designated poster print mode as print setting information in PDL data (print data). The preview controller 202 determines in step S403 based on the acquired number of layout pages whether or not the poster print mode is designated. If the number of layout pages is two or more, it is determined that the poster print mode is designated, and the process advances to step S404. In step S404, the group specifying unit 207 calculates the number of group pages from the number of layout pages to update the number of group pages, and the process then advances to step S405. On the other hand, if the number of layout pages is 1 in step S403, it is determined that the poster print mode is not designated, and the process jumps to step S405 while the number of group pages=1.

In step S405, the preview controller 202 decides a page number P as a preview display base point (initial value is 1). Note that when the user touches the page feeding key 313 or 314 in FIG. 3, the process starts from step S405 and subsequent steps, and a page number to be displayed next is decided based on the page number P and the number of group pages.

In subsequent loop processing of steps S406 to S409, the preview controller 202 generates page images as many as the number of group pages decided by the group specifying unit 207 by calling the PDL data analysis unit 203 and page image generator 206. More specifically, in step S407, the PDL data analysis unit 203 decides a paper size from PDL data, and then generates rendering objects. In step S408, the page image generator 206 generates a page image according to the paper size.

After the page images corresponding to the number of group pages are generated, the preview controller 202 decides a layout of a preview image and then calls the page image editing unit 204 to notify that unit 204 of a preview target page number and instruction contents of the poster print mode in step S410. That is, if the poster print mode is designated, the called page image editing unit 204 lays out page images in a group in turn from a page number as a base point to one image in step S411. Finally, in step S412, the preview controller 202 receives a preview image generated by the page image editing unit 204, and issues a display instruction to the UI controller 201.

As described above, since this embodiment adopts the number of layout pages in the poster print mode as the determination condition of the relevance according to output forms between a plurality of pages, the number of pages to be displayed at the same time in the preview mode can be dynamically changed according to input data contents. At this time, the number of pages of a group corresponds to the number of layout pages in the poster print mode. As described above, this embodiment displays a preview screen having an appearance indicating the relevance between a plurality of pages.

Second Embodiment

Figure 5:
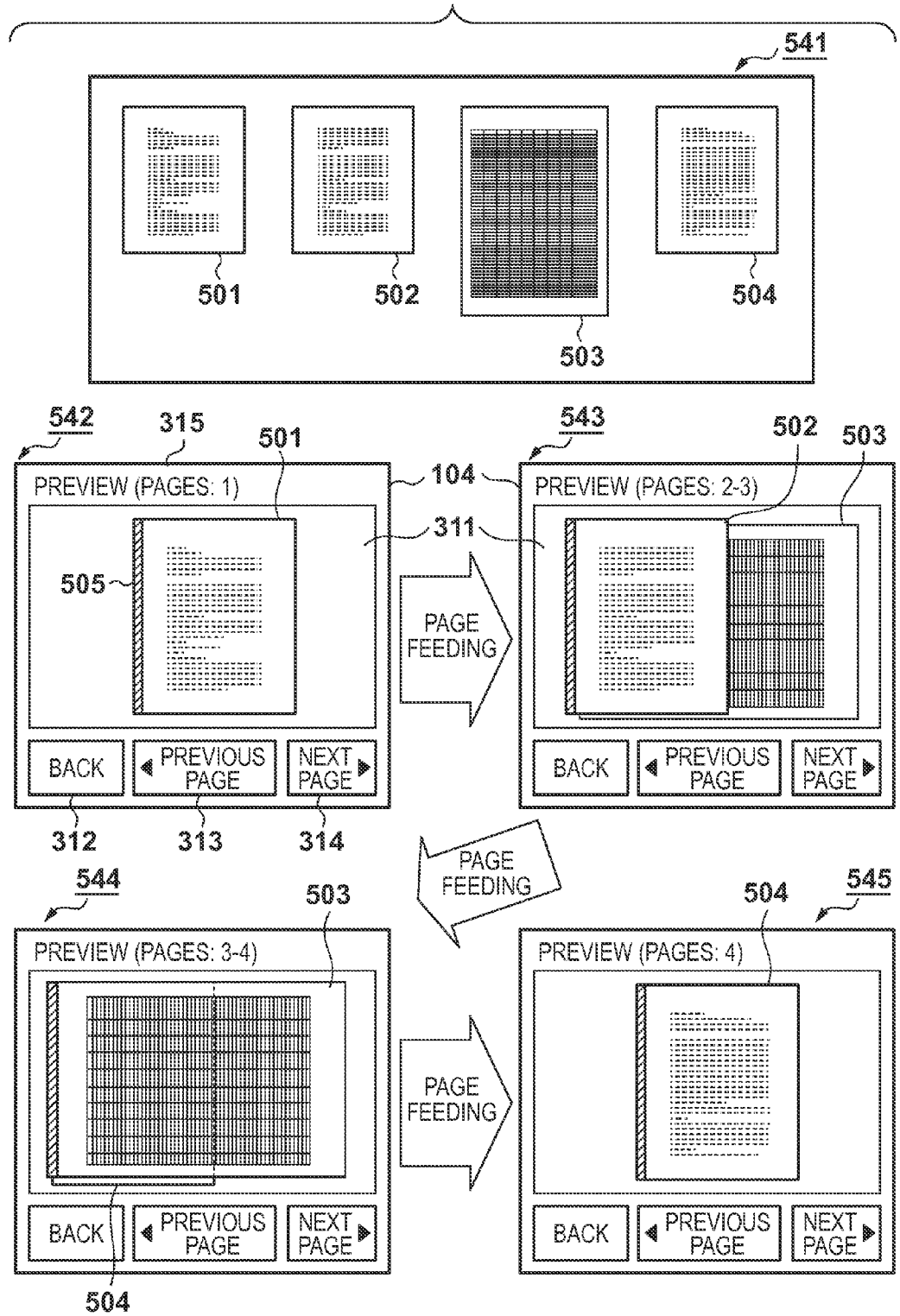
FIG. 5 is a view showing the data configuration and a preview screen example according to the second embodiment.
Figure 6:
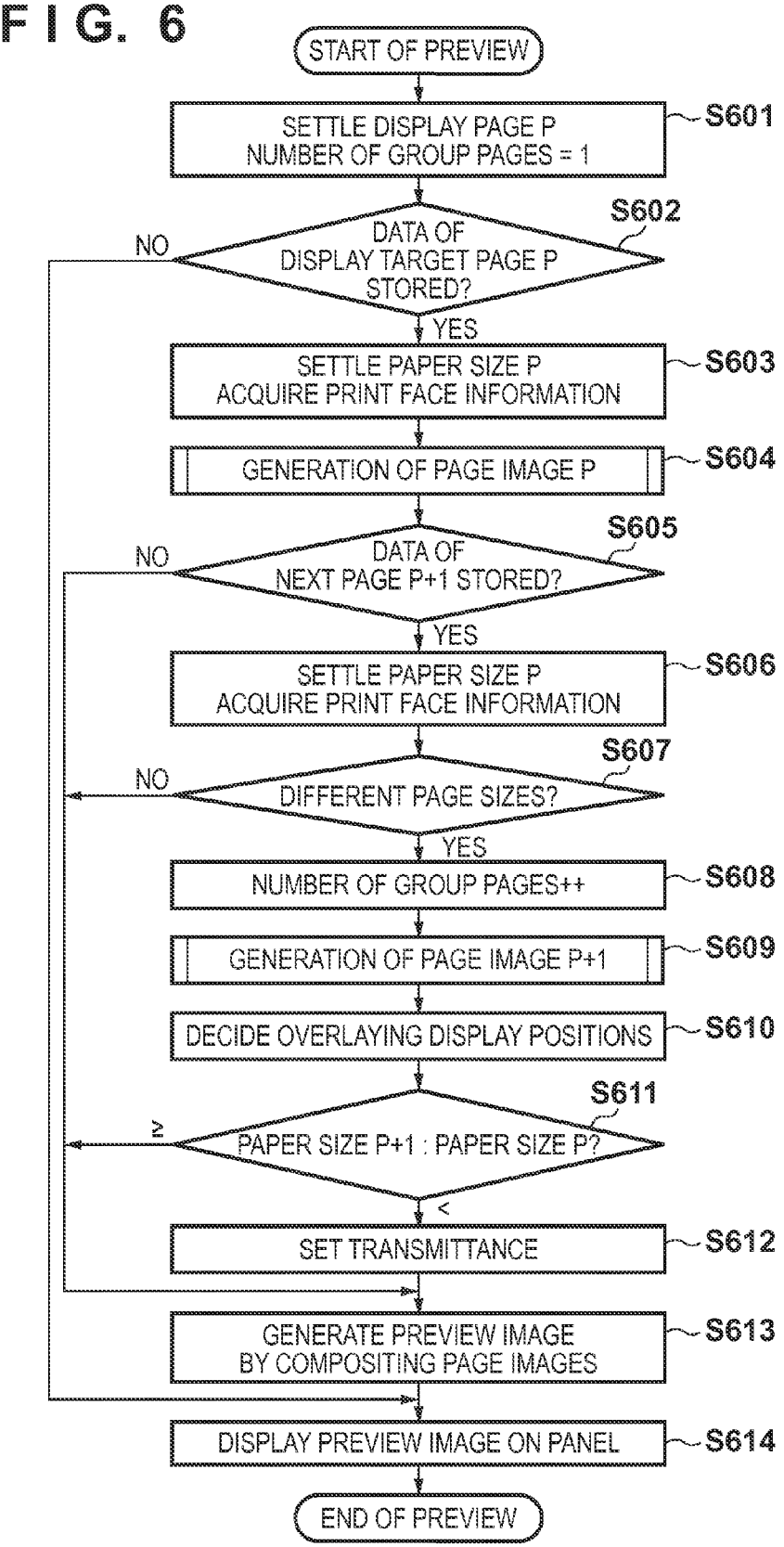
FIG. 6 is a flowchart showing the sequence of preview processing according to the second embodiment.

The second embodiment will be described below with reference to FIGS. 5 to 7. The first embodiment has exemplified the poster print mode as the determination condition of the relevance according to output forms between a plurality of pages. However, this embodiment will explain a case in which whether or not a preview target page and subsequent page have different paper sizes is used as the determination condition. Therefore, the number of pages of a group changes every time print data is analyzed for each page. That is, when pages have different paper sizes, the number of pages of a group is 2; when they have the same size, it is 1. A preview display state of a plurality of pages having the relevance as one group in association with print data including sheets of different sizes under the control of the preview controller 202 and its processing sequence will be described below. Note that a description of the same arrangement and control as in the first embodiment will not be repeated.

<Preview Display>

A preview display mode of this embodiment will be described first with reference to FIG. 5. In FIG. 5, reference numeral 541 denotes page contents of print documents. Reference numerals 501, 502, and 504 (pages 1, 2, and 4) respectively denote A4-size documents; and 503 (page 3), an A3-size document. In this embodiment, since an Nin1 setting, double-sided print setting, and the like are not made as print settings for the sake of simplicity, a document page matches page contents of print data generated by a printer driver. Reference numerals 542 to 545 respectively denote states of an LCD screen of the operation unit 104 when preview images corresponding to the print data 541 are displayed.

Reference numeral 542 denotes a preview screen immediately after the user touches a preview button on a screen for selecting print data to be printed in, for example, a box print function, that is, a display example of the first page 501 in the print data. In this case, since the first page 501 and subsequent page 502 have the same paper size, the group specifying unit 207 determines that the number of pages of a group is 1, and the number of pages displayed on a preview screen is also 1. The paper size of each page is acquired with reference to PDL data or the menu DB 211 by calling the PDL data analysis unit 203 from the group specifying unit 207. Note that the page image editing unit 204 of this embodiment overlays image data 505 indicating a binding position on a page image based on binding position information set in print data or via a menu, and displays them as a preview image.

Reference numeral 543 denotes an example of a preview result displayed when the user touches the "next page" key 314 in a state of the preview screen 542. At this time, since the group specifying unit 207 recognizes that a paper size of the subsequent page 503 obtained by calling the PDL data analysis unit 203 is different from that of the sheet 502, it determines that the number of pages of a group is 2, and the number of pages displayed as preview images is also 2. More specifically, upon reception of the pages 502 and 503, the page image editing unit 204 overlays the page 502 having an A4 size on the page 503 having an A3 size, and generates a preview image which allows the user to easily recognize a mixed stacking state of discharged sheets, as denoted by reference numeral 543.

Likewise, reference numerals 544 and 545 denote preview results when the user touches the "next page" key 314 to feed a page. Note that in the first embodiment, a unit of page feeding changes in synchronism with the number of pages of a group (the number of layout pages in the poster print mode). However, in this embodiment, a unit of page feeding is fixed to one page. For this reason, when the user touches the "next page" key 314, the preview controller 202 advances a base point of the page to be displayed next by 1 independently of the number of pages of a group. Hence, even between pages having different sizes, the unit of page feeding is one page. Therefore, when the user touches "next page" key 314 on a screen 543, the page advances by 1 to set a page 503 as a base point, and this page 503 has a size different from the page 504 as the next page. Hence, it is determined that the number of pages of a group is 2, and the number of previews to be displayed is also 2, as indicated by the preview result 544. As a page number to be displayed on the screen area 315, a preview target page number as a base point ("2" in the preview result 543) and a last page number in a group ("3" in the preview result 543) are displayed.

<Preview Display Processing>

The preview processing sequence of this embodiment will be described below with reference to FIGS. 6 and 7. Note that respective steps of FIGS. 6 and 7 are also implemented when the CPU 121 loads and executes program codes of respective modules shown in FIG. 2 in the program ROM 122*a*. Also, a detailed description of steps which can be the same processes as those in the first embodiment will not be repeated.

In step S601, the preview controller 202 initializes the number of pages of a group (to be referred to as the number of group pages) to 1, decides a page number P of a preview target, and then calls the PDL data analysis unit 203 so as to generate a page image of the page P. That is, when the user inputs a preview instruction on a screen for selecting print target data from a candidate list, if he or she updates a preview page by a page feeding key (next page/previous page key) when P=1 (corresponding to the state 542), a page number obtained by incrementing/decrementing the immediately preceding P by a unit (1) of page feeding is set.

Then, the PDL data analysis unit 203 and page image generator 206 generate a preview page image corresponding to the page P in steps S602 to S604. More specifically, the PDL data analysis unit 203 determines in step S602 whether or not PDL data to be analyzed is stored. If the PDL data is stored, the process advances to step S603. Note that in step S603, a print face (obverse/reverse face) is also decided in addition to the processing for acquiring a paper size from the PDL data as in step S407 of the first embodiment. As for the page image generation processing in step S604, differences from step S408 of the first embodiment will be described later with reference to the flowchart shown in FIG. 7.

After the page image P is generated in step S604, the process advances to step S605, and the PDL data analysis unit 203 determines whether or not the PDL data includes a subsequent page P+1. If the page P+1 is included, the process advances to step S606 and subsequent steps since page images are previewed while being overlaid only when the paper size changes from the page P. In step S606, the PDL data analysis unit 203 settles a paper size of the page P+1 as in step S603. Subsequently, the group specifying unit 207 determines in step S607 based on the paper size received from the PDL data analysis unit 203 whether or not the page P and page P+1 have different paper sizes. If it is determined that the page P and page P+1 have different paper sizes, the process advances to step S608, and the group specifying unit 207 determines that the respective pages belong to one group to set the number of group pages to be 2. Then, the process advances to step S609. On the other hand, if it is determined that the two pages have the same paper size, the number of group pages remains set to be 1 and is not updated, and the process jumps to step S613 without executing any processing of the page P+1. Assume that in step S606, the PDL data analysis unit 203 acquires information of a print face (obverse/reverse face) in addition to a paper size.

In step S609, the page image generator 206 generates a page image of the page P+1, and stores it in the page image buffer 208 as in the page P. Note that since the processing of step S609 is the same as that of step S604, only differences from step S408 of the first embodiment will be described later with reference to the flowchart shown in FIG. 7. After page images as many as the number of group pages are generated in this way, the preview controller 202 decides an overlaying method of preview images in steps S610 to S612. Then, the preview controller 202 calls the page image editing unit 204, and notifies it of preview target page numbers and layout information.

More specifically, in step S610, the preview controller 202 decides an overlaying position (layout) of page images based on binding position information designated by the PDL data or menu DB 211, paper sizes of respective pages, and the print face information. For example, when the page P is an obverse face and the page P+1 is also an obverse face (single-sided print mode), and the binding position information designates "to align binding positions to A4 long sides", a layout in which pages are overlaid while the left ends of sheets are aligned is set, as indicated by the preview result 543. On the other hand, in case of a setting in which the page P is a reverse face and the page P+1 is an obverse face (double-sided print mode), the respective page images are laid out to be juxtaposed without being overlaid.

In steps S611 and S612, the preview controller 202 decides an image transmittance upon overlaying the page images based on the paper sizes of the respective pages to be overlaid. That is, in step S611, the preview controller 202 compares the paper size of the page P with that of the page P+1. In this case, if the paper size of the page P+1 is smaller than that of the page P, the process advances to step S612, and the preview controller 202 decides a transmittance upon rendering of the page P to be a predetermined value, so as to prevent the page P+1 on the back side from being hidden when the page images are overlaid. Reference numeral 544 denotes an example of preview images processed in this way. On the other hand, if it is determined in step S611 that the paper size of the page P+1 is larger than that of the page P, the transmittance is set to be 0 (completely opaque).

Next, in step S613, the page image editing unit 204 renders the page image P+1 as a back surface to have a transmittance=0 on the preview image buffer, and then overlays the page image P in a predetermined layout according to the transmittance decided in step S612. Finally, since the preview image display sequence in step S614 is the same as that in step S412, a description thereof will not be repeated.

Figure 7:
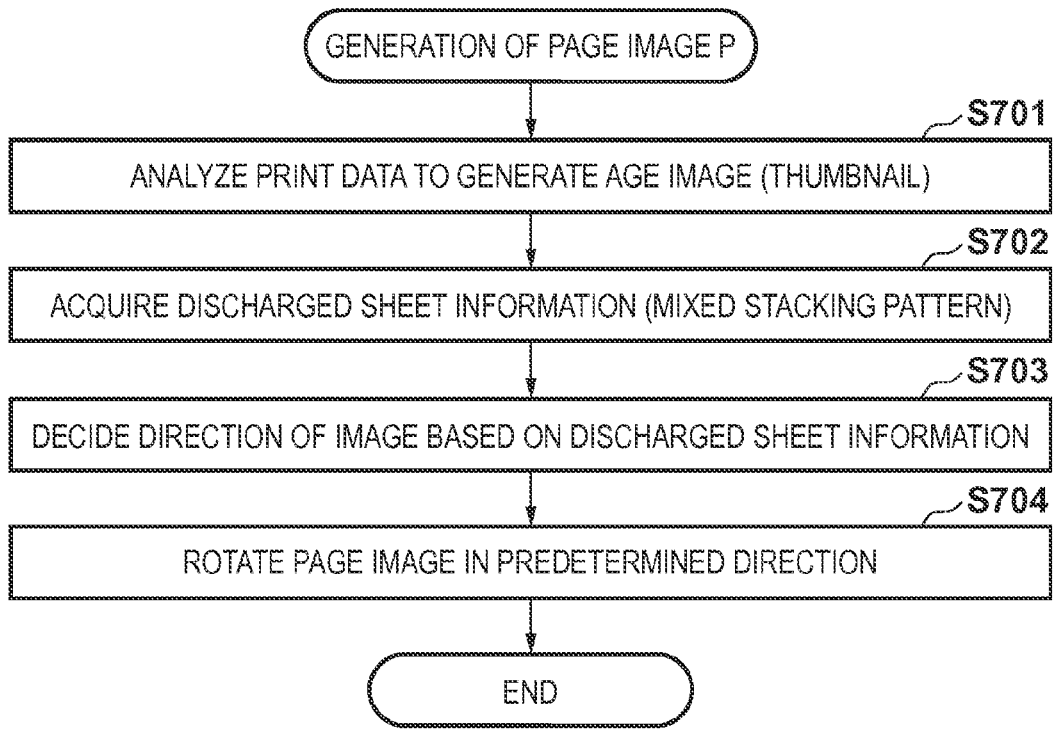
FIG. 7 is a flowchart showing the page image generation sequence according to the second embodiment.

FIG. 7 is a flowchart showing the page image generation sequence to be executed by the PDL data analysis unit 203 and page image generator 206 in steps S604 and S609. In step S701, the PDL data analysis unit 203 reads out print data, and generates rendering objects in an intermediate format. Furthermore, the page image generator 206 generates a preview page image based on the rendering objects, and temporarily stores it in the page image buffer 208.

In step S702, the page image generator 206 calls the PDL data analysis unit 203 to acquire a paper size and binding position information of a target page, and then calls the engine controller 205 to acquire sheet convey direction information of the target page. Furthermore, the page image generator 206 decides a rotation direction of the page image based on the sheet convey direction information in step S703, and applies rotation processing to the generated page image if the rotation direction is not 0° in step S704. In this case, the rotated page image is temporarily stored in a rotation buffer 210 in the work memory 123c. With this processing sequence, since the convey direction of a sheet to be actually discharged matches the rotation direction of the preview image, a preview image which allows the user to easily recognize a final discharged sheet form in consideration of the binding direction is generated.

As described above, information as to whether or not continuous print pages have different paper sizes is used as the determination condition of the relevance according to output forms between a plurality of pages, the number of pages to be displayed in the preview mode can be dynamically changed according to the input data contents. For this reason, whether or not a binding method for print data including sheets of different sizes is correctly designated can be easily confirmed without increasing a preview processing load.

Third Embodiment

The third embodiment will be described below with reference to FIGS. 8 to 10. This embodiment will explain an example in which the present invention is applied to a case in which insert paper is designated immediately after a preview target page as still another determination condition of the relevance according to output forms between a plurality of pages. In this embodiment, for a page immediately before insert paper is designated, the number of pages of a group is 2; when insert paper is not designated, the number of pages is 1. Depending on insert paper types, the number of pages of a group is changed for respective pages, and it is fixed for the entire image data. For example, as insert paper types, insert paper designated as a paper type OHP, chapter paper sheets inserted at arbitrary page positions, and the like are available, but the present invention is not limited to them. In case of OHP insert paper sheets, insert paper sheets are appended to all pages, the number of pages of a group is always 2. On the other hand, when chapter paper sheets are inserted at arbitrary positions, only a page immediately before the insertion position has the number of pages of a group=2.

A preview display state of a plurality of pages having the relevance as one group in association with print data designated with OHP insertion under the control of the preview controller 202 and its processing sequence will be described below. Note that a description of the same arrangement and control as those in the first and second embodiments will not be repeated.

Figure 8:
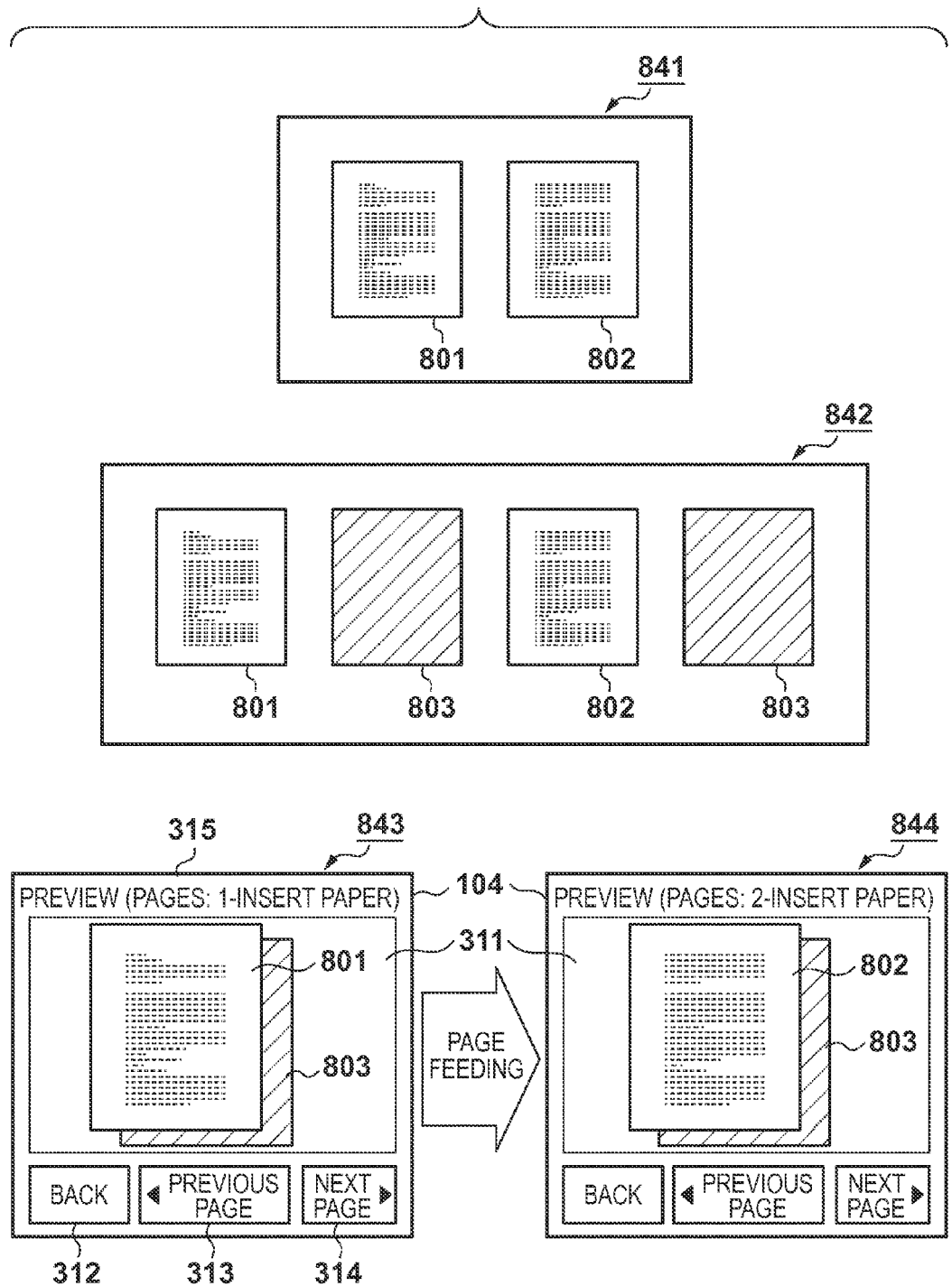
FIG. 8 is a view showing the data configuration and a preview screen example according to the third embodiment.
Figure 9:
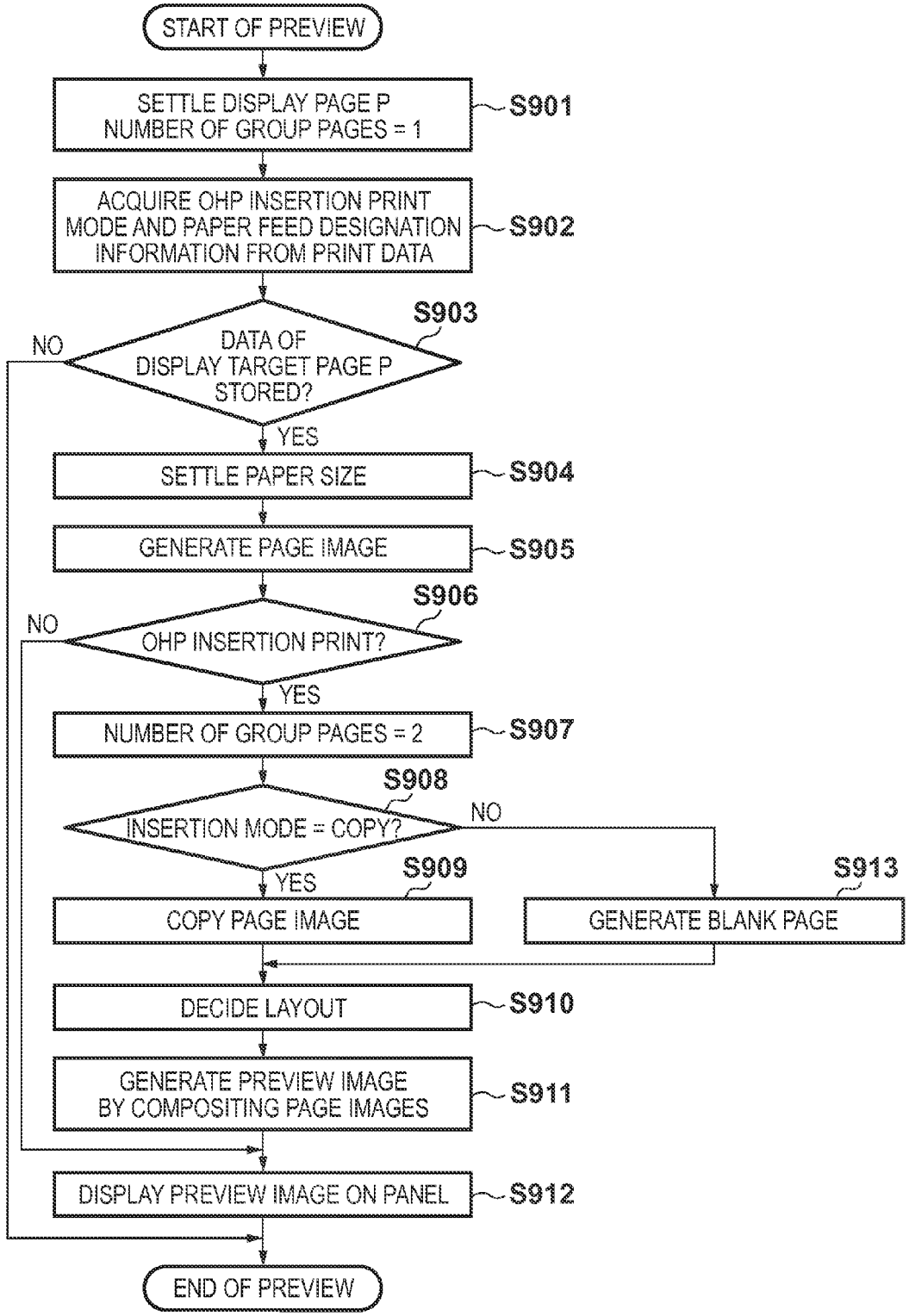
FIG. 9 is a flowchart showing the sequence of preview processing according to the third embodiment.

In FIG. 8, reference numeral 841 denotes page contents of print documents. Reference numeral 801 denotes page 1 of an A4 size; and 802, page 2. In this embodiment as well, the following description will be given under the assumption that document page matches page contents of print data generated by a printer driver for the sake of simplicity.

Reference numeral 842 denotes a discharged sheet form to be finally output when an OHP insertion print mode is designated for print data including document pages from the operation panel of the printer driver. The form 842 shows a state in which insert paper sheets 803 are respectively inserted immediately after document pages 801 and 802 printed on OHP sheets. In this example, a "not print on insert paper" mode is designated as the OHP print insertion mode, and each insert paper sheet 803 is a blank sheet. On the other hand, when a "print on insert paper" mode is designated as the insertion mode, the page image generator 206 copies a page image of the immediately preceding page to print a document having the same contents on an insert paper sheet, and discharges that sheet. When OHP paper is designated as a paper type, the printer driver disables a double-sided print setting, and always generates print data designated with a single-sided print mode. Note that the insertion mode is appended to print data as a print parameter by the printer driver, and is referred to by the PDL data analysis unit 203. The same applies to designation of insert paper of another type such as chapter paper.

Reference numerals 843 and 844 denote states of the LCD screen of the operation unit 104 upon execution of preview display operations for the print data 841. As in the first embodiment, reference numeral 843 denotes a preview screen immediately after the user touches a preview button on a screen for selecting print data to be printed in, for example, a box print mode from a candidate list, that is, a display example of the first page 801 in the print data. Since the insertion mode is designated for OHP paper, the group specifying unit 207 decides the number of pages of a group to be 2 for all pages, and the page image editing unit 204 generates a preview image by overlaying two pages of the document page and insert paper. Note that the insert paper is laid out at a lower right offset position on the back side of the preview target page to overlay the two pages, as indicated by the states 843 and 844. A character string indicating paper feed deck information may be embedded in a page image of the insert paper to allow the user to recognize a paper feed port from which insert paper sheets are fed.

When the user designates page feeding by the "next page" key 314 from the state 843, the preview controller 202 displays a preview image in which page 2 (802) and insert paper are overlaid, as indicated by the state 844. In this case, since a unit of page feeding is set to be 2 which is the same as the number of group images, a preview image is updated by a unit of two pages including the document page and insert paper. Note that in this embodiment, the unit of page feeding is fixed to "2". However, when insert paper is inserted at an arbitrary position like chapter paper, page feeding may be configured to display only pages having the number of group pages=2. In this case, the unit of page feeding can be calculated from insert paper position information designated in the print data and the target page number of the currently displayed preview image.

The preview processing sequence of this embodiment will be described below with reference to FIG. 9. Note that respective steps of FIG. 9 are implemented when the CPU 121 loads and executes program codes of the respective modules shown in FIG. 2 in the program ROM 122a. Note that a description of the same arrangement and control as those in the first and second embodiments will not be repeated. Since processing of step S901 to be executed by the preview controller 202 is the same as that of step S601 in FIG. 6, a description thereof will not be repeated.

Next, the PDL data analysis unit 203 and page image generator 206 generate a preview page image corresponding to a page P in steps S902 to S905. In step S902, the PDL data analysis unit 203 checks with reference to the print data or menu DB 211 whether or not the OHP insertion print mode is designated, and if the OHP insertion print mode is designated, it acquires the OHP insertion mode and paper feed deck information of insert paper sheets designated by parameters. Since the subsequent processes of steps S903 to S905 are the same as those of steps S602 to S604 in FIG. 6, a description thereof will not be repeated.

Subsequently, the preview controller 202 determines in step S906 with reference to the OHP insertion print mode setting acquired in step S902 whether or not the OHP insertion print mode is set. If the OHP insertion print mode is set, the process advances to step S907, and the group specifying unit 207 sets the number of group images to be 2. Furthermore, the page image generator 206 determines in step S908 whether or not the insertion mode is a "print on insert paper" mode. If the insertion mode is the "print on insert paper" mode, the process advances to step S909, and the page image generator 206 copies a page image generated in step S905 to generate a new page image. On the other hand, if the insertion mode is not the "print on insert paper" mode, the process advances to step S913, and the page image generator 206 generates a blank page image.

In step S910, the page image editing unit 204 decides an overlaying layout of the page image of the document page and insert paper. Since subsequent steps S911 and S912 are the same as the processes of steps S613 and S614 in FIG. 6, a description thereof will not be repeated.

<Print Data>

An example of the configuration of print data of this embodiment will be described below with reference to FIG. 10. Print data 1000 includes a job control header 1001, document control header 1002, PDL data 1003, document control footer 1004, and job control footer 1005. The job control header 1001 is header information required to control print data as one job, and includes a job start instruction having parameters such as an owner name and print mode at a first position, and setting parameters such as a print resolution, which are common to the whole print job. In this example of this embodiment, a hold print mode is designated as the print mode.

The document control header 1002 is header information required to designate print settings for each document included in the print job. When the print data includes a plurality of documents, control headers are appended for respective documents. In this embodiment, as parameters included in the document control header 1002, the "OHP insertion print mode" and "insert paper feed deck information" are included. Note that when the "OHP insertion print mode" parameter is not included or "OFF" is set as a value, insert paper control is not executed. The PDL data 1003 describes rendering data which form respective pages in a predetermined page description language format. In this embodiment, as parameters of "page start instruction", designations of a paper size and paper type are accepted. The document control footer 1004 and job control footer 1005 are respectively control footers indicating the ends of the document and job.

As described above, according to this embodiment, since the presence/absence of insert paper is adopted as the determination condition of the relevance according to output forms between a plurality of pages, the number of pages to be displayed in the preview mode can be dynamically changed according to the input data contents. For this reason, whether or not insert paper designation is correctly set can be easily confirmed without increasing a preview processing load.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-024523 filed on Feb. 7, 2012, which is hereby incorporated by reference herein in its entirety.

What is claimed is:

1. An image forming apparatus for executing image formation according to print data having a plurality of pages, comprising:
   a control unit configured to;
   analyze a predetermined relevance according to output forms between pages based on setting information of the print data, and
   generate a preview image including, as a group, a plurality of pages having the same predetermined relevance for a page for which the predetermined relevance is analyzed, and to generate a preview image of only a page for which the predetermined relevance is not analyzed; and
   a display unit configured to display, for each group, the preview image including the plurality of pages, and
   wherein a unit of page feeding in the preview image changes in synchronism with a number of pages of the group.

2. The apparatus according to claim 1, wherein the predetermined relevance is specified in accordance with a number of layout pages of a poster print mode as a condition,
   the control unit does not specify the predetermined relevance when the number of layout pages is 1, and specifies the predetermined relevance when the number of layout pages is not less than 2, and
   generates a preview image using pages corresponding to the number of layout pages as a group for a page for which the predetermined relevance is analyzed.

3. The apparatus according to claim 2, wherein the display unit displays preview images to allow page feeding, and when page feeding is executed, the display unit displays a preview image corresponding to a subsequent page in a case where a currently displayed page is a page for which the predetermined relevance is not analyzed, and displays a preview image corresponding to a page advanced by pages corresponding to the number of layout pages in a case where the currently displayed page is a page for which the predetermined relevance is analyzed.

4. The apparatus according to claim 1, wherein the predetermined relevance is specified in accordance with a condition as to whether or not a target page as a preview target and a subsequent page have different paper sizes,
   the control unit does not specify the predetermined relevance when the target page and the subsequent page have the same paper size, specifies the predetermined relevance when the target page and the subsequent page have the different paper sizes, and generates a preview image using the target page and the subsequent page as a group for a page for which the predetermined relevance is analyzed.

5. The apparatus according to claim 4, wherein the control unit comprises a comparison unit configured to compare a paper size of the target page and a paper size of the subsequent page upon generation of a preview image of a page for which the predetermined relevance is analyzed, and when the paper size of the target page is smaller than the paper size of the subsequent page, the control unit generates a preview image in which the target page is laid out on the subsequent page, and when the paper size of the target page is larger than the paper size of the subsequent page, the control unit generates a preview image in which the target page is laid out on the subsequent page, and a transmittance is set for the target page.

6. The apparatus according to claim 4, wherein when the control unit generates the preview image of the page for which the predetermined relevance is analyzed, the control unit generates the preview image by rotating an image of an arbitrary page so that binding positions of the target page and the subsequent page match according to binding position information included in the setting information.

7. The apparatus according to claim 1, wherein the predetermined relevance is specified in accordance with a condition as to whether or not insert paper is designated immediately after a target page as a preview target, the control unit does not specify the predetermined relevance in a case where the insert paper is not designated immediately after the target page, and specifies the predetermined relevance in a case where the insert paper is designated immediately after the target page, and the control unit generates a preview image to have the target page and the insert paper as a group in association with the page for which the predetermined relevance is analyzed.

8. The apparatus according to claim 7, wherein the display unit displays preview images to allow page feeding, and when page feeding is executed, the display unit displays a preview image corresponding to a subsequent page in a case where a currently displayed page is a page for which the predetermined relevance is not analyzed, and displays a preview image corresponding to a page corresponding to a page next to the insert paper in a case where the currently displayed page is a page for which the predetermined relevance is analyzed.

9. A control method of an image forming apparatus for executing image formation according to print data having a plurality of pages, comprising:

analyzing to analyze a predetermined relevance according to output forms between pages based on setting information of the print data;

generating a preview image including, as a group, a plurality of pages having the same predetermined relevance for a page for which the predetermined relevance is analyzed, and generating a preview image of only a page for which the predetermined relevance is not analyzed; and controlling a display unit to display, for each group, the preview image including the plurality of pages, and wherein a unit of page feeding in the preview image changes in synchronism with a number of pages of the group.

10. A computer-readable medium storing a computer program for controlling a computer to execute respective steps in a control method of an image forming apparatus of claim 9.

11. An image forming apparatus for executing image formation according to print data having a plurality of pages, comprising:

a control unit configured to:

analyze a relevance between pages based on setting information of print data, and generate a preview image so that a plurality of pages having the relevance analyzed are displayed on a single screen; and a display unit configured to display, as a group, the preview image including the plurality of pages, wherein a unit of page feeding in the preview image changes with synchronism with a number of pages of the group.

12. The apparatus according to claim 11, wherein the generation unit generates a preview image having an appearance indicating the relevance.

* * * * *